US011188313B1

(12) United States Patent
Huffman et al.

(10) Patent No.: US 11,188,313 B1
(45) Date of Patent: Nov. 30, 2021

(54) FEATURE FLAG PIPELINE

(71) Applicant: Microsoft Technology Licensing, LLC, Redmond, WA (US)

(72) Inventors: Jaime Seral Huffman, Black Diamond, WA (US); Katja Sabina Kevic, Cambridge (GB); Brendan Seamus Murphy, Hemingford Abbots (GB); Carlene Lebeuf, Seattle, WA (US); Brian Hassan Krakower, Redmond, WA (US); Jennifer Lee Beckmann, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/102,353

(22) Filed: Nov. 23, 2020

(51) Int. Cl.
*G06F 8/41* (2018.01)
*G06F 11/36* (2006.01)
*G06K 9/62* (2006.01)
*G06F 11/30* (2006.01)

(52) U.S. Cl.
CPC .......... *G06F 8/433* (2013.01); *G06F 11/3051* (2013.01); *G06F 11/3065* (2013.01); *G06F 11/3604* (2013.01); *G06K 9/6211* (2013.01)

(58) Field of Classification Search
None
See application file for complete search history.

(56) References Cited

U.S. PATENT DOCUMENTS

| 10,262,155 | B1 * | 4/2019 | Sun | G06F 21/629 |
| 10,776,180 | B1 * | 9/2020 | Ma | G06F 9/468 |
| 10,824,548 | B1 * | 11/2020 | Kapusta | G06F 11/3688 |
| 2015/0248301 | A1 * | 9/2015 | Shani | G06F 8/54 |
| | | | | 717/163 |
| 2016/0063282 | A1 * | 3/2016 | Shani | G06F 9/38 |
| | | | | 717/121 |
| 2017/0132123 | A1 * | 5/2017 | DiTullio | G06F 11/3696 |
| 2017/0168919 | A1 * | 6/2017 | Eberlein | G06F 11/3664 |
| 2018/0322038 | A1 * | 11/2018 | Thazhathekalam | |
| | | | | G06F 11/3696 |
| 2020/0104125 | A1 * | 4/2020 | Pechacek | G06F 8/24 |
| 2020/0104773 | A1 * | 4/2020 | Pechacek | G06Q 10/06316 |

(Continued)

*Primary Examiner* — Qing Chen
(74) *Attorney, Agent, or Firm* — NovoTechIP International PLLC

(57) ABSTRACT

Techniques performed by a data processing system for automatically managing feature flags in source code include automatically analyzing source code associated with a software program to identify a set of first feature flags; obtaining, from a configuration server associated with the software program, dynamic configuration information associated with a second set of feature flags, wherein the dynamic configuration information includes configuration information for configuring one or more operating parameters of the software program without redeploying the software program; correlating the set of first feature flags included in the source code with the set of second feature flags to match the dynamic configuration information with the feature flags of the set of first feature flags; generating feature flag reporting information; providing the feature flag reporting information to at least one consuming application; and causing the at least one consuming application to perform at least one action associated with at least one feature flag of the first set of feature flags.

20 Claims, 9 Drawing Sheets

(56) References Cited

U.S. PATENT DOCUMENTS

2021/0089299 A1\* 3/2021 Gupta .................. G06F 8/72
2021/0157670 A1\* 5/2021 Kagan ................ G06F 11/3636

\* cited by examiner

```
function sampleMethod(){
    var useNewMethod = false;
    // useNewMethod = true;  // UNCOMMENT IF WORKING ON NEW METHOD if( useNewMethod ){
        return newMethod();
    } else {
        return oldMethod();
    }
} function oldMethod(){
    // current method implementation
} function newMethod(){
    // TODO: implement new functionality
}
```

To: developer1@contoso.com
From: featureflagbot@contoso.com
Re: a bug report to remove feature flag XYZ from the source code of Product X has been created Dear Developer1, Bug report X.1233.4 has been opened in the Bug Tracking Portal. Please ensure that this bug report remains open until the feature flag XYZ is removed from the source code of Product X at the location(s) specified in the bug report. It is important to remove the feature flags from the source code once they are no longer being used so that we do not drastically and unnecessarily increase the complexity of our code over time.

You may access the bug report by clicking on the bug report number link above or by entering the bug report number into the Bug Tracking Portal.

Thank you,

Feature Flag Bot

FIG. 8

FEATURE FLAG PIPELINE

BACKGROUND

Feature flags are an important tool used in software development that allows software developers to enable or disable functionality of certain aspects of the software remotely without having to deploy a new code release. Feature flags are often used to for deploying and testing new features of software. The feature flags associated with the new features may be toggled off to render these features invisible to most users. Developers may selectively enable these features for certain users, such as software testing teams, alpha and/or beta testers, and/or other users who may have early access to the features. Using feature flags, software developers can manage the lifecycle of new features. However, managing the feature flags themselves can become challenging. Software developers often manage the feature flags manually, which can lead to human error in managing the feature flags. Furthermore, the code base for a particular application may include millions of lines of code that may include tens of thousands of features flags. Manually managing so many feature flags is impractical, if not impossible. Hence, there is a need for improved systems and methods that provide a technical solution for solving the technical problem of automatically managing feature flags.

SUMMARY

An example data processing system according to the disclosure may include a processor and a computer-readable medium storing executable instructions. The instructions when executed cause the processor to perform operations including automatically analyzing source code associated with a software program to identify a set of first feature flags included in the source code by accessing a set of feature flag regular expressions for identifying the set of first feature flags in the source code and performing a search on the source code using the set of feature flag regular expressions; obtaining, from a configuration server associated with the software program, dynamic configuration information associated with a second set of feature flags, wherein the dynamic configuration information includes configuration information for configuring one or more operating parameters of the software program without redeploying the software program; correlating the set of first feature flags included in the source code with the set of second feature flags to match the dynamic configuration information with the feature flags of the set of first feature flags; generating feature flag reporting information for each of the first feature flags; providing the feature flag reporting information to at least one consuming application configured to process the feature flag reporting information; and causing the at least one consuming application to perform at least one action associated with at least one feature flag of the first set of feature flags.

An example method implemented in a data processing system for automatically managing feature flags in source code includes automatically analyzing the source code associated with a software program to identify a set of first feature flags included in the source code by accessing a set of feature flag regular expressions for identifying the set of first feature flags in the source code and performing a search on the source code using the set of feature flag regular expressions; obtaining, from a configuration server associated with the software program, dynamic configuration information associated with a second set of feature flags, wherein the dynamic configuration information includes configuration information for configuring one or more operating parameters of the software program without redeploying the software program; correlating the set of first feature flags included in the source code with the set of second feature flags to match the dynamic configuration information with the feature flags of the set of first feature flags; generating feature flag reporting information for each of the first feature flags; providing the feature flag reporting information to at least one consuming application configured to process the feature flag reporting information; and causing the at least one consuming application to perform at least one action associated with at least one feature flag of the first set of feature flags.

An example computer-readable storage medium on which are stored instructions. The instructions when executed cause a processor of a programmable device to perform functions of automatically analyzing source code associated with a software program to identify a set of first feature flags included in the source code by accessing a set of feature flag regular expressions for identifying the set of first feature flags in the source code and performing a search on the source code using the set of feature flag regular expressions; obtaining, from a configuration server associated with the software program, dynamic configuration information associated with a second set of feature flags, wherein the dynamic configuration information includes configuration information for configuring one or more operating parameters of the software program without redeploying the software program; correlating the set of first feature flags included in the source code with the set of second feature flags to match the dynamic configuration information with the feature flags of the set of first feature flags; generating feature flag reporting information for each of the first feature flags; providing the feature flag reporting information to at least one consuming application configured to process the feature flag reporting information; and causing the at least one consuming application to perform at least one action associated with at least one feature flag of the first set of feature flags.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 4A and 4B are examples of a user interface that may be used to present the feature flag information in a code editor.

FIG. 8 shows an example of email that may be automatically generated by a feature flag bot responsive to identifying a stale feature flag in the source code of a software product.

DETAILED DESCRIPTION

Figure 1:
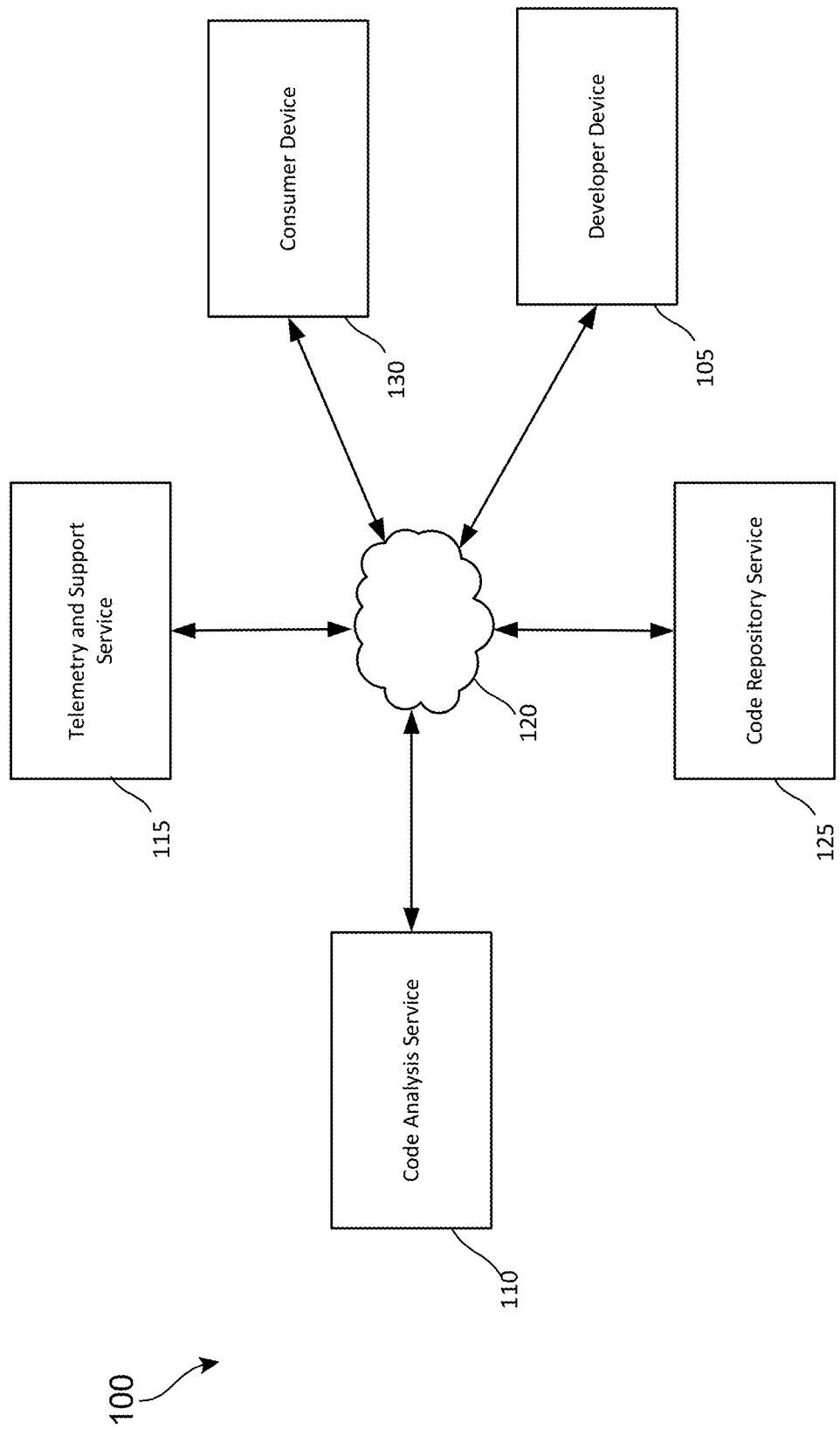
FIG. 1 is a diagram showing an example of a computing environment 100 in which the techniques provided herein for managing feature flags in a program code base may be implemented.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Feature flags may also be referred to as feature gates or feature switches. Feature flags are configured to enable or disable a specific set of functionalities within program code. Feature flags are often widely deployed in software releases but are often turned on for a subset of the consumers who are utilizing the software. The features flags may be turned on statically in the code or dynamically by a service. Such dynamic configurations may be used to enable certain features for a specific audience and/or to run an experiment on specific functionality. New features may be rolled out initially to a subset of consumers using a software product before the features are made available to remaining users. This approach can be an effective means for testing new functionality without having to generate multiple builds of the software product. Instead, users may be granted access through dynamic configuration parameters which trigger the new logic for those users. However, these feature flags often do not get cleaned up in the source code and may result in unreadable, untestable, and inefficient code being included in the software product.

Another problem that may be introduced by multiple feature flags is that the feature flags may have conflicting audience definitions, which can result in features being incorrected enabled or disabled for users. This can be a complex issue to diagnose and may take a significant amount of time and effort to track down the source of the problem. Furthermore, as the number of feature rollouts relying on feature flags increase, the dynamic configuration servers which may be used to activate or deactivate features via the feature flags may become overloaded. Moreover, the size of the features controlled by the feature flags can be quite large and may consume unnecessary memory, network, and processing resources to support functionality that is no longer desired or necessary. Thus, there is a need to manage feature flags. In particular, there is a need to identify and remove old feature flags that are no longer needed.

Techniques for automatically managing feature flags and/or other software components described herein provide a technical solution for solving the technical problem of managing feature flags and/or other software components in software builds. These techniques provide a feature flag pipeline which may automatically analyze program code to identify new feature flags, to identify changes to code that include existing features flags, to identify feature flags that are included in software builds that may be causing problems with the software, and/or other information related to managing of feature flags. The feature flag pipeline may generate reports that include information for all of the feature flags included in a particular code base, including which builds the feature flags may be included in and whether the feature flags are enabled in each build. The reports may also include information indicting when the feature was added to the program code and who added the feature flag to the code. The feature flag pipeline may also generate feature flag information that may be rendered in an editor of an integrated software environment with the program code being viewed, edited, or modified within the editor. A technical benefit of the tools provided by the feature flag pipeline enable software developers, project managers, and others associated with the development of complex software suites to efficiently manage a large number of feature flags that would be difficult or impossible to manually track. Another benefit of the tools provided by the feature flag pipeline is that these tools can support feature flag management across multiple development teams through automated identification and tracking of feature flags. Software development may be divided into multiple development teams that are each responsible for designing and writing the source code for certain features of a software application or software suite. Even if each team carefully documents feature flags that they add to the program code, this information may not be effectively communicated with members of other teams. Thus, diagnosing performance issues in a complex software build may become even more difficult. However, the reporting features of the feature flag pipeline can identify which features flags are included in a particular build, who owns the feature flags, and any issues with the software build that may be associated with the feature flag. Another technical benefit of the feature flag pipeline is that feature flags that are no longer needed may be identified eventually removed from the program code base. As a result, unnecessary code can be automatically identified for removal from the code base to provide cleaner and more streamlined software products that do not include deprecated functionality.

FIG. 1 is a diagram showing an example of a computing environment 100 in which the techniques provided herein for managing feature flags in a program code base may be implemented. The computing environment 100 may include a code analysis service 110. The example computing environment 100 may also include a developer device 105, a consumer device 130, a telemetry and support service 115, and a code repository service 125. The developer device 105 may communicate with the code analysis service 110 and/or the code repository service 125 via the network 120. The consumer device 130 may communicate with the telemetry and support service 115 via the network 120. The network 120 may be a private network, such as the network of a company, education institution, or other entity developing software. The network 120 may also include one or more public and/or semi-public network components. For example, the network 120 may include one or more network elements of the Internet. Thus, the developer device 105, the consumer device 130, the code analysis service 110, the telemetry and support service 115, and the code repository service 125 may be in different geographical locations and may communicate with one another through the network 120.

In the example shown in FIG. 1, the code analysis service 110 is implemented as a cloud-based service or set of services. The code analysis service 110 may be configured to automatically analyze program code to identify new feature flags, to identify changes to code that include existing features flags, to identify feature flags that are included in software builds that may be causing problems with the software, and/or other information related to managing of feature flags. The code analysis service 110 may implement a feature flag pipeline, such as the feature flag pipeline 200 shown in FIG. 2, for managing feature flags in program code maintained by the code repository service 125. Additional elements of the feature flag pipeline 200 are shown below.

The developer device 105 is a computing device that may be a desktop computer, laptop computer, or computing device having other form factor. The developer device 105 may be configured to allow a software developer to access the code base stored by the code repository service 125 to edit existing code, write new code, and/or delete existing code. The developer device 105 may provide an integrated development environment (IDE) that may be used to develop computer programs, websites, web applications, web service, and/or mobile applications. The IDE may be, but is not limited to, Microsoft Visual Studio. The IDE may provide a code editor that allows enables the software developer to edit existing code and/or write new code. The IDE may also provide other services, such as code refactoring, which provides updates the design, structure, and/or implementation of the program code without changing the functionality of the program code. The IDE may also provide a means for identifying feature flags in the program code and for providing means for the user to obtain additional information about the feature flags. For example, the IDE may be configured to highlight the feature flags in the program code in a particular color, render the feature flags in a particular font, and/or or provide another indication that a particular reference in the program code is a feature flag. The user interface of the IDE may automatically add a link to the feature flag that the user may click on to obtain additional information about the feature flag and/or may render a window displaying information about the feature flag when the user hovers over the highlighted text. Additional information regarding the feature flag information that may be presented to the user is described in greater detail in the examples which follow. The IDE may also provide tools that allow the software developer to compile or build the software being edited or written by the developer. An executable application may be generated on the developer device 105 and/or on a remote computing device. While the example implementation illustrated in FIG. 1 includes one developer device, other implementations may include a different number of developer devices.

The consumer device 130 is a computing device that may be a desktop computer, laptop computer, tablet computer, wearable computer, smartphone, or computing device having other form factor. The consumer device 130 is a device on which a computer programs, websites, web applications, web service, mobile application, or other software product developed by a developer may be executed and/or accessed. The software product may include one or more feature flags which may be monitored by the code analysis service 110. Furthermore, the software product may be configured to provide telemetry data to the telemetry and support service 115. The telemetry data may include information about the performance of the software product. The information may include application health and performance information, application security information, and/or customer experience information that indicates how the software product has performed. The application health and performance information may include error information indicative of problems experienced by the software product. For example, some functionality of the software product may have failed and thrown an exception that is caught and logged. The failure may have occurred in a portion of the code associated with a feature flag. The code analysis service 110 may be configured to access the telemetry data received by the telemetry and support service 115 to identify data associated with a feature flag. The usage of such data will be discussed in greater detail in the examples which follow.

The code repository service 125 may be a cloud-based application that is configured to manage the program code for one or more software products. The code repository service 125 may provide storage of program code and version control. The repository service 125 may track changes that were made to each version of each file associated with a particular software product. The repository service 125 may be configured to allow software developers to create builds of one or more software products by associating version of source code of components of the software products with a respective build. The code analysis service 110 may be configured to access the program code stored by the code repository service 125 to identify code that includes feature flags. The feature flag pipeline 200 shown in FIG. 2 shows additional details as to how the information maintained by the code repository service 125 may be used by the code analysis service 110.

In the example shown in FIG. 1, the code analysis service 110 is shown as a cloud-based service that may be accessed over a network. However, other implementations of the code analysis service 110 may be implemented by the code repository service 125 or by the developer device 105.

Figure 2:
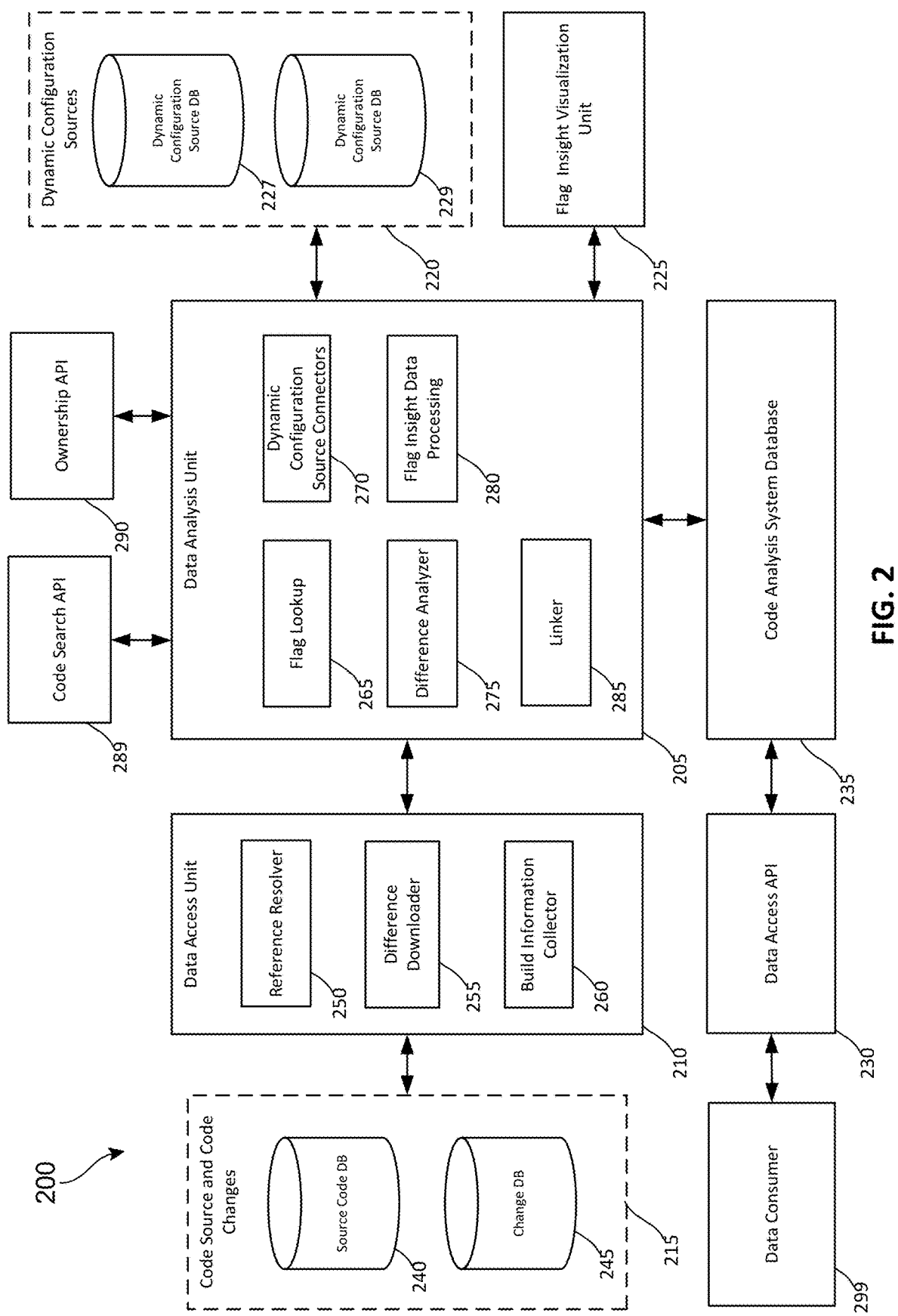
FIG. 2 is an example of a feature flag pipeline that may be implemented by the code analysis service shown in FIG. 1.

FIG. 2 shows an example of a feature flag pipeline 200 that may be implemented by the code analysis service 110. The feature flag pipeline 200 may be configured to identify feature flags included in the program code of a software product. The feature flag pipeline 200 may include a data analysis unit 205, a data access unit 210, a code analysis system database 235, and a flag insight visualization unit 225.

The data access unit 210 may be configured to access source code for the software product and change history information for the source code and to provide the source code and change history information to the data analysis unit 205 for processing. The data access unit 210 may include a reference resolver 250, a difference downloader unit 255, and a build information collector 260. The data access unit 210 is configured to obtain information from the code source and code changes external data sources 215.

The code source and code changes external data sources 215 include one or more data repositories in which the program code for one or more software products may be stored, such as the source code database 240, and one or more data repositories for storing information indicative of changes made to the source code in various version of the source code, such as the change database 245. The source code database 240 and the change database 245 may be implemented by a relational database or other type of database that may be used to store source code for the software product and a change history for the various source code, configuration files, metadata, and/or other files associated with the software product. While the source code database 240 and the change database 245 are shown as separate databases in FIG. 2, the information associated with each of these databases may be stored in a single database. The source code database 240 and the change database 245 may be implemented as a relational database or other searchable datastore. The code source and code changes external data sources 215 may be implemented by the code repository service 125 shown in FIG. 1.

The difference downloader unit 255 is configured to download difference information for the source code for the software application from the change database 245 and to provide the change information to the difference analyzer 275 of the data analysis unit 205. The change information identifies source code that has been modified. The change information may be identified for source code files that have changed since the difference downloader unit 255 was last run. The difference downloader unit 255 may be scheduled to run periodically to check for changes. The last run time for the difference downloader unit 255 may be stored in the code analysis system database 235 and the difference downloader unit 255 may access this stored last run time to determine which source code changes should be analyzed by the difference analyzer 275 of the data analysis unit 205. The source code that changed may include one or more feature flags that were added, removed, and/or modified.

The build information collector 260 obtains information for one or more builds of the software application from the change database 245. The data analysis unit 205 may determine which feature flags are included in which builds and whether the feature flags are activated or deactivated in each respective build. This information may be reported to software engineers who are working on the source code that includes these feature flags, project managers who are managing the development and deployment of certain features, software testers who are testing software builds to ensure that those builds are performing as intended, and/or other users who have a role in the development of the software product.

The reference resolver 250 is configured to resolve references to other source code within the source code accessed by the difference downloader unit 255. The source code being referenced may also be accessed from the source code database 240 and provided to the data analyzer unit 205 for analysis. The reference resolver 250 helps to ensure that feature flags included in files being reference by source code of the software product are analyzed by the data analyzer unit 205.

The data analyzer unit 205 is configured to analyze the data obtained by the data access unit 210. The difference analyzer 275 is configured to analyze differences between versions of the source code to identify new feature flags that have been added to the source code, feature flags that have been removed from the source code, and feature flags that have been modified. The difference analyzer 275 may be configured to track each of the feature flags that encountered in the source code and store information about each of these feature flags in the code analysis system database 235. The difference analyzer 275 may track each of these feature flags throughout the lifecycle of the source code of the software product.

The difference analyzer 275 may be configured to analyze the source code using regular expressions that are configured to identify feature flags in the source code. The set of regular expressions used by the difference analyzer unit 275 may be stored in the code analysis system database 235. A regular expression may be defined for each type of feature flag that may be included in the source code. In some implementations, the feature flag pipeline 200 may provide a user interface that allows software developers to add a regular expression for identifying a particular feature flag or type of feature flag to the set of regular expressions used by the difference analyzer unit 275. While the examples discussed herein describe identifying feature flags in the code, the regular expressions described here may be used to identify other constructs in the program code, and the difference analyzer unit 275 may be configured to analyze the source code to identify additions of these components, modifications of these components, and/or the deletion of these components from the source code.

The feature flags and/or other code constructs identified by the difference analyzer unit 275 may be provided to the linker unit 285. The linker unit 285 is configured to link any references to the feature flags identified in the source code to the dynamic configurations of the feature flags. Feature flags may be dynamically configured based on settings maintained by one or more dynamic portals, such as those of the dynamic configuration sources 220. The dynamic configuration settings may be used to dynamically turn on or turn off features associated with the feature flags without having to rebuild the source code. The dynamic configuration sources 220 shown in FIG. 2 includes two dynamic configuration source databases 227 and 229. The dynamic configuration databases 227 and 229 may include feature flags configuration information for one or more feature flags. In some implementations, the configuration databases 227 and 229 may be implemented in a single database. In other implementations, the dynamic configuration sources 220 may include additional configuration sources. The number of dynamic configuration sources 220 of the dynamic configuration sources 220 may depend upon the implementation of the software product. For example, a first set of configuration flags associated with a first set of functionality may be implemented in a first configuration database by a first development team, and a second set of configuration flags associated with a second set of functionality may be implemented in a second configuration database by a second development team.

The dynamic configuration source connectors 270 may provide an Application Programming Interface (API) for accessing the one or more dynamic configuration sources 220. A separate connector may be provided for each of the dynamic configuration sources 220. The dynamic configuration source connectors 270 may provide the configuration data obtained from the one or more dynamic configuration sources 220 to the linker unit 285 for processing as discussed above.

The linker unit 285 may also be configured to identify feature flags that have been removed from the source code. The difference analyzer 275 may use the regular expression as described above to identify the presence of feature flags and/or other code constructs in the source code. However, the use of the regular expressions does not identify the absence of previously added feature flags from the source code. A particular feature flag or feature flags may be added to the source code for testing and/or experiment with a particular functionality of the software product. Once this testing or experimentation is complete, the feature flag used to turn on or turn off this functionality may be removed from the source code. The linker unit 285 may access from a list of feature flags that were previously detected in the code analysis system database 235. The linker unit 285 may initiate a search through the source code for each of these previously detected feature flags. The flag lookup unit 265, described below, may conduct the search through source code for the previously detected feature flags.

The flag lookup unit 265 may receive as an input the list of feature flags that were previously detected and conduct a search through the source code for these feature flags. The flag lookup unit 265 may be configured to look up feature flag information in the source code using the code search API 289. The code search API may be configured to search the source code database 240 and/or the change database 245 of the code source and code changes external data sources 215 to determine whether the feature flag still exists in the source code. If the feature flag still exists in the source code, the code search API may return a search result for that feature flag that indicates where in the source code that the feature flag was found and other information associated with the feature flag, such as the builds in which the feature flag was included. If a feature flag is not found, then the feature flag may have been deleted from the source code, and the code analysis system database 235 may be updated to indicate that the feature flag has been deleted from the source code. The code analysis system database 235 does not delete the feature flag from the database, because it could be added back in subsequent modifications to the source code.

The linker unit 285 may be configured to output feature flag reporting information determined for each of the feature flags identified via the difference analyzer 275 and the flag lookup unit 265 into the code analysis system database 235. The code analysis system database 235 may include a set of tables for storing the feature flag information which may be used to generate various reports and visualizations of the feature flag data. The data access API 230 provides a means for accessing the feature flag data stored in the code analysis system database 235. The data access API 230 may be accessed by components of the data analysis unit 205 to generate reporting and/or visualization information for the feature flag data. The data access API 230 may also be accessed by external reporting and visualization tools that may formulate queries to access the feature flag data stored in the code analysis system database 235 to generate reports and queries therefrom.

The feature flag data stored in the code analysis system database 235 may include which builds each feature flag is included, whether each feature flag is activated or deactivated in each build, which functionality is enabled or disabled as a result of the feature flag being enabled or disabled, when the feature flag was added to the source code, and/or other information regarding the feature flags. The feature flag information may be used to assess whether a particular feature flag is currently being used, whether the feature flag may be associated with functionality that is causing performance problems for the software product in which the feature flag is incorporated, and/or other information that may be useful to a software developer or other user for understanding how the feature flag impacts the program code.

The flag lookup unit 265 may also be configured to look up feature flag information ownership in the source code using the ownership API 290. The ownership API 290 may be configured to search the change database 245 to identify the owner of a particular feature flag. The change database 245 may include information identifying the software developer that added a particular feature flag to the source code as well as when the feature flag was added. The ownership API may also be configured to query a developer information database to obtain additional information the software developer that added the feature flag to the program code. The developer information database may be maintained by an organization, enterprise, or other entity that is developing the program code. The developer information may include information identifying one or more project teams with which the software developer is associated or has been associated. The project team information may be useful for understanding why a particular feature flag was added to the program code. The ownership information for each feature flag may be added to the code analysis system database 235.

The flag insight data processing unit 280 may be configured to summarize the information that is obtained for each of the feature flags by the flag lookup unit 265 and/or other components of the data analysis unit 205 and to format that information for presentation in various ways to users. The flag insight data processing unit 280 may summarize the information is to prepare a summary of the feature flag information that may be displayed for each feature flag included in the code base. The feature flag information may be provided to the developer device 105 of the software developer viewing, editing, and/or writing program code in a code editor on the developer device 105. The flag insight visualization unit 225 may be configured to receive the summary information generated by the flag insight data processing unit 280 and to present a visualization of that information to the software developer.

Figure 4B:
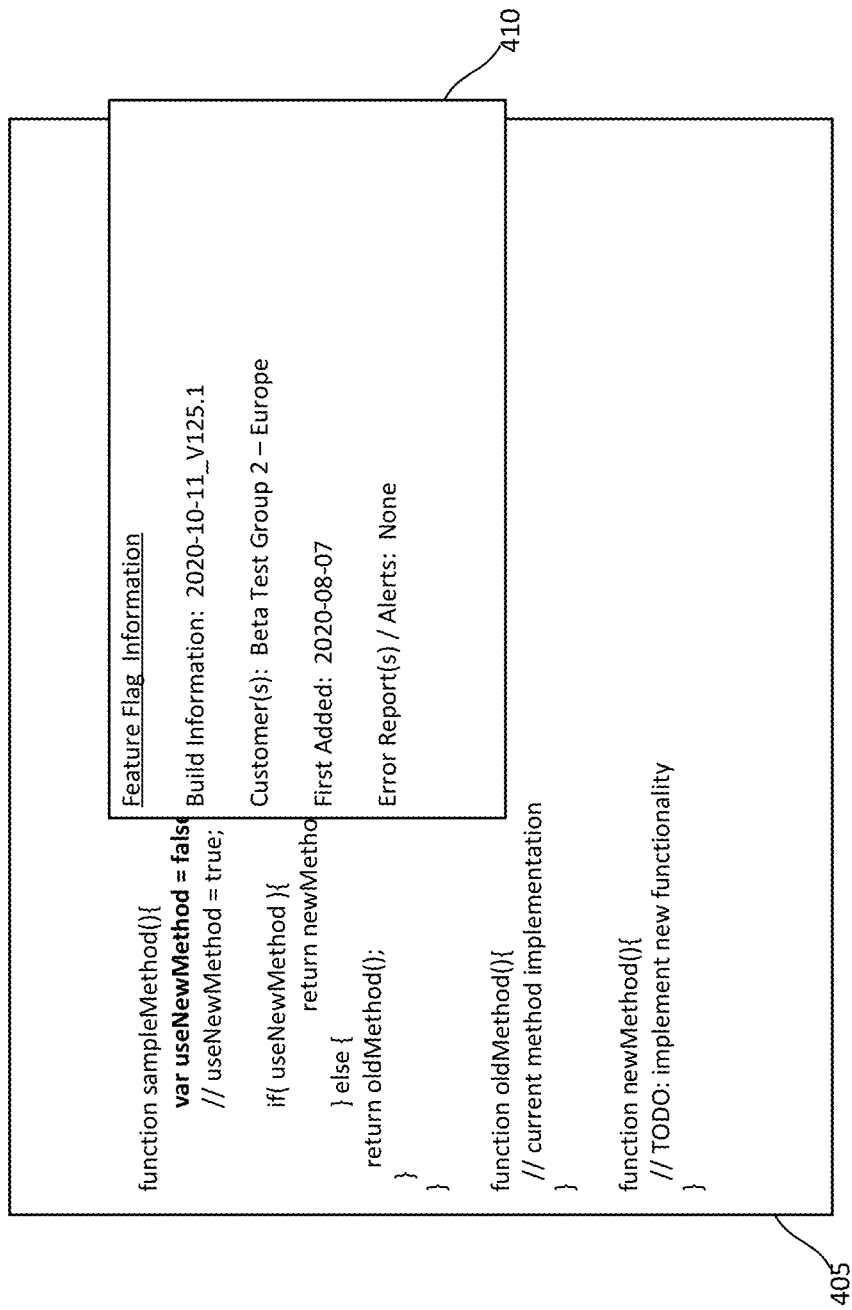

FIGS. 4A and 4B show an example of the user interface 405 of a code editor which may be executed on the developer device 105. The code editor may be part of an IDE, such as Microsoft Visual Studio, which may provide various tools for editing existing code, refactoring code, compiling and testing code, and/or other tools for facilitating development of a software products. As discussed in the preceding examples, the IDE may highlight feature flags in a particular color or render the text of the code associated with the feature flag using a particular font. In the example shown in FIGS. 4A and 4B, the feature flag has been identified and rendered in bold text in the code editor user interface 405. FIG. 4B shows an example of a popup window 410 that may be displayed in response to the software developer hovering over the bold text of the feature flag. The popup window may provide various information about the feature flag, such as a build or builds in which the feature flag has been included, customers for which the feature flag has been activated (for customer specific flags), a date on which the feature flag was first added to the program code, who added the feature flag to the program code, and/or whether the software flag is owned by a particular software developer or team of developers. The feature flag information may also include error report and/or alert information associated with the feature flags. As discussed with respect to FIG. 1, the telemetry and support service 115 may receive telemetry information from the consumer device 130 that includes error information and/or alert information generated by a build of a software application executed by the consumer device 130. The build of the software application may include feature flags that were activated, and the error information and/or alert information may identify whether the code enabled by the feature flag has been experiencing problems on the consumer device 130. This approach to visualization of the feature flag information provide a significant technical benefit of presenting the feature flag information to the software programmer right in the code editor so that the software programmer can quickly identify feature flags included in the program code which the software programmer is viewing or editing.

Returning to FIG. 2, a data consumer 299 may access the feature flag data stored in the code analysis system database 235 using the data access API 230. The data consumer 299 may be a reporting application that is configured to access and query the feature flag information stored in the code analysis system database 235. The data consumer 299 may be feature flag bot for automating at least a portion of the steps of identifying "stale" feature flags that are no longer in use or have not been used for a least a predetermined amount of time. The automated tool may be configured to automatically generate a bug report in a bug tracking system that identifies feature flag that is suspected to stale, a location or locations in the code of the feature flag is referenced (e.g., a file name and line number or other indicator of the location of the feature flag), a build in which the feature flag was introduced, who introduced the feature flag, and other additional information. This approach allows the feature flag bot to automate much of the process of managing stale feature flags so that they receive attention from a software developer responsible for maintaining the code in which the feature flag is found. FIG. 8 shows an example of an automated email 805 that may be generated by the feature flag bot and send to a software developer responsible for maintaining the code. The feature flag bot may first automatically generate the bug report in the bug tracking system and then generate the email assigning the bug to the appropriate software developer.

In some implementations, the feature flag bot may be fully automated. The feature flag bot may identify a stale feature flag, automatically open a bug report, automatically identify the references to the stale feature flag in the program code, and automatically update the program code to remove the stale feature flag and check the code into a change management system. The feature flag bot may be trained to recognize references to the feature flags, such as by using regular expressions utilized by the difference analyzer 275 of the feature flag pipeline 200. The bug report may be set to a fixed state so that the updated code is included in a build and tested by testing team before being released in a build that made available users of the software product that is updated automatically to remove the feature gates. Such an automated approach may help to significantly reduce the number of stale feature flags in the source code of a software program which can produce a more efficient executable objects for the software program that utilize less memory and/or processing resources. Furthermore, the chances of two feature flags adversely interacting with one another may be significantly reduced by eliminating stale feature flags that are no longer being used for new feature development and/or experimentation.

Figure 3:
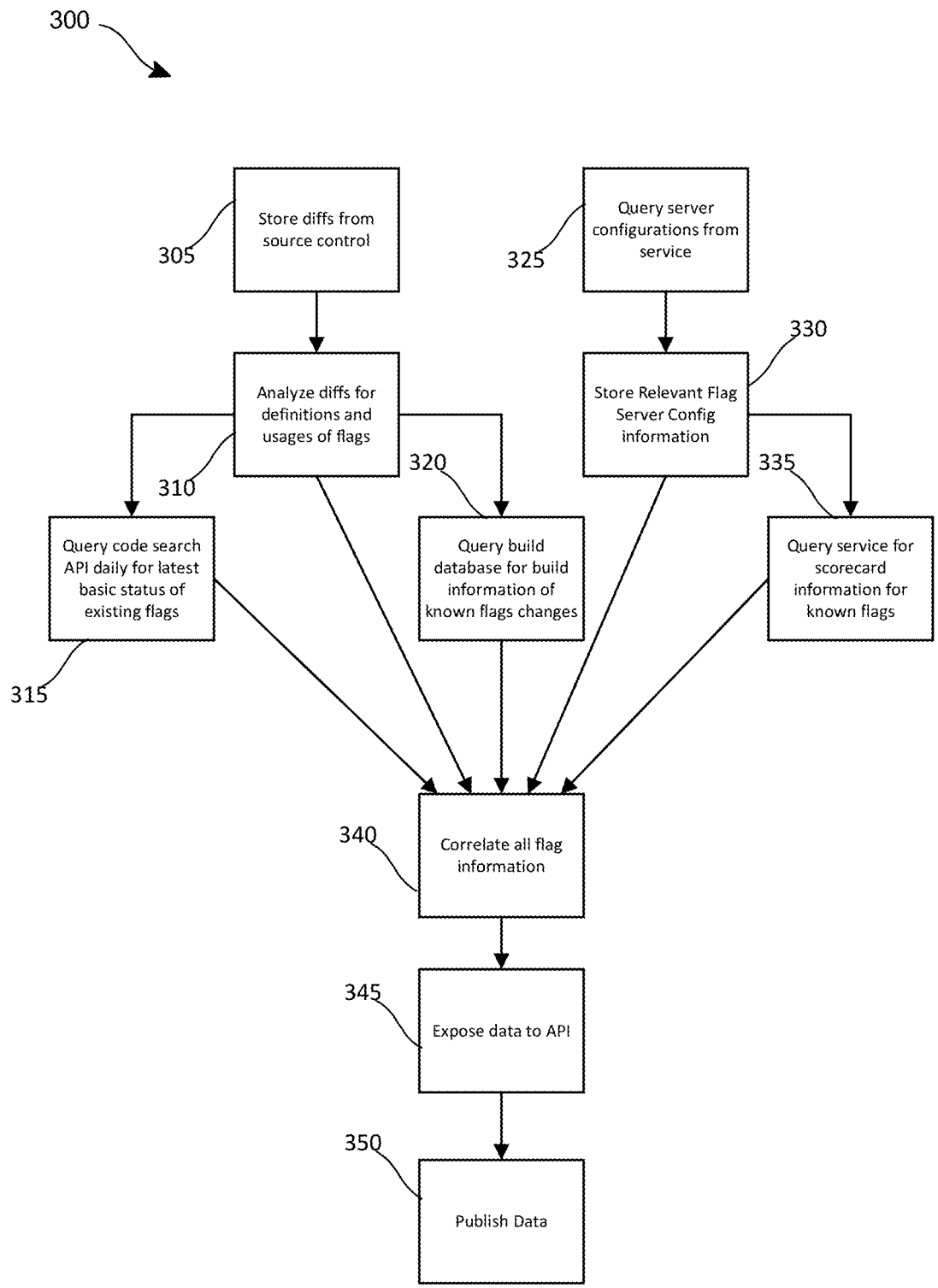
FIG. 3 is an example flow diagram of a process for analyzing feature flag information that may be implemented by the feature flag pipeline of FIG. 2

FIG. 3 is a flow diagram of a process 300 for processing feature flag information included in program code. The process 300 may be implemented by the feature flag pipeline 200 of the code analysis service 110.

The process 300 may include an operation 305 of storing difference information from source control. As discussed with respect to FIG. 2, the data access unit 210 may be configured to access the code source and code changes external data sources 215 to obtain the difference information between various versions of the source code associated with a software product.

The process 300 may include an operation 310 of analyzing the differences for definitions and/or usages of feature flags. As discussed with respect to FIG. 2, the difference analyzer 275 may be configured to analyze differences in the source code to identify new and/or existing feature flags. The difference analyzer 275 may also identify feature flags that have been removed from the program code in the differences. The difference analyzer 275 may also identify changes to the usage of the feature flags, such as the activation or deactivation of the feature flag in the program code and/or changes to the program code executed in response to the feature flag being activated.

The process 300 may include an operation 315 in which the code search API 289 may be queried to obtain status information for existing feature flags. The code search API 289 may be provided with feature flag identifiers identified in operation 310 by the difference analyzer 275. The query may be performed periodically to determine whether the status of any of the feature flags has changed. For example, whether a particular feature flag has been activated or deactivated in the code and/or changes have been made to the program code executed in response to the feature flag being activated. The operation 315 may be performed automatically periodically. For example, the code search API 289 may be executed daily to update the feature flag status information for the feature flags identified in the source code.

The process 300 may include an operation 320 in which a query is performed of build information to determine whether the identified feature flags from operation 310 are associated with a build. The build information collector 260 may perform operation 320. The build information collector 269 may periodically query the change database 245 and/or the source code database 240 to identify builds which include source code in which the feature flags identified in operation 310 are found.

The process 300 may include an operation 325 in which server configuration information may be queried from the dynamic configuration services 220. The dynamic configuration services 220 may be implemented on a server or servers that provide dynamic configuration information to one or more builds of one or more software products. The dynamic configuration information may be used to dynamically switch on or off one or more feature flags included in the one or more builds of the one or more software products. The software product may be configured to obtain the configuration information from the dynamic configuration services 220 when the software product is executed on a consumer device 130.

The process 300 may include an operation 330 of storing the relevant flag server configuration information. The configuration information queried from the dynamic configuration services 220 may be stored in the code analysis system database 235. The configuration information may be used to determine which features flags are switched on or off dynamically. This information may be used to determine the performance of the feature associated with the feature flags that have been dynamically configured.

The process 300 may include an operation 335 of obtaining performance information for known feature flags. As discussed in the preceding examples, the telemetry and support service 115 may receive telemetry data from the software product as the software product is executed in response to the consumer device 130 causing the software product to be executed. The software product may report errors and exceptions that occur during execution of the software product to the telemetry and support service 115. The errors and exceptions may be associated with functionality that is associated with a feature flag. This functionality may be experimental or under test, and the information collected may be used to determine whether the functionality is operating as expected.

The process 300 may include an operation 340 of correlating the feature flag information obtained in the preceding operations. The feature flag information for each of the feature flags identified in the code may be correlated by the linker unit 285. The linker unit 285 may store the information associated with each of the feature flags in the code analysis system database 235.

The process 300 may include an operation 345 of exposing the data access API 230 to allow the feature flag information stored in the code analysis system database 235 to be queried and operation of 350 of making the data available in the code analysis system database 235 available to be queried via the data access API 230. The code analysis system 110 may be configured to automatically generate one or more reports regarding the feature flags for project managers, software engineers who are associated with projects associated with the program code that includes the feature flags, the feature flag owners, and/or other users who may wish to track the status of the feature flags in the code base. The code analysis system database 235 may provide a user interface that allows the users to customize the reports to focus on specific software products, specific feature flags, specific feature flag owners, and/or other customized reports that may be used to monitor the lifecycle of feature flags. The code analysis system 110 may also provide other reports, such as a new feature flag report that identifies feature flags that have been added to the code base within a predetermined period of time. The code analysis system 110 may also provide a report that identifies feature flags that have not been activated or deactivated for at least a predetermined amount of time and may be candidates for cleanup and removal from the code base. The code analysis system 110 may also automatically generate a report for feature flags for which the underlying code associated with the feature flag has been modified within a predetermined amount of time. A user associated with the code changes and/or an owner of the feature flag may quickly identify changes to the code base that may impact a particular feature flag. Furthermore, the code analysis system 110 may generate a report that identifies performance problems associated with code associated with feature flags. This information may be used by software developers and/or program testers to identify new or experimental features that may not be operating as expected. Other types of reports may be automatically generated by the code analysis system 110. Furthermore, the data access API 230 may allow reporting applications to access and query the feature flag information stored in the code analysis system database 235.

The telemetry data associated with a feature associated with a feature flag may be evaluated to determine whether the feature associated with the feature flag is functioning as expected. If the feature is not functioning as expected, the feature may be dynamically deactivated by deactivating the first feature flag maintained by the dynamic configuration sources 220. The linker 285 may be configured to update the dynamic configuration information for the feature flag associated with the malfunctioning feature via the dynamic configuration source connectors 270.

Figure 5:
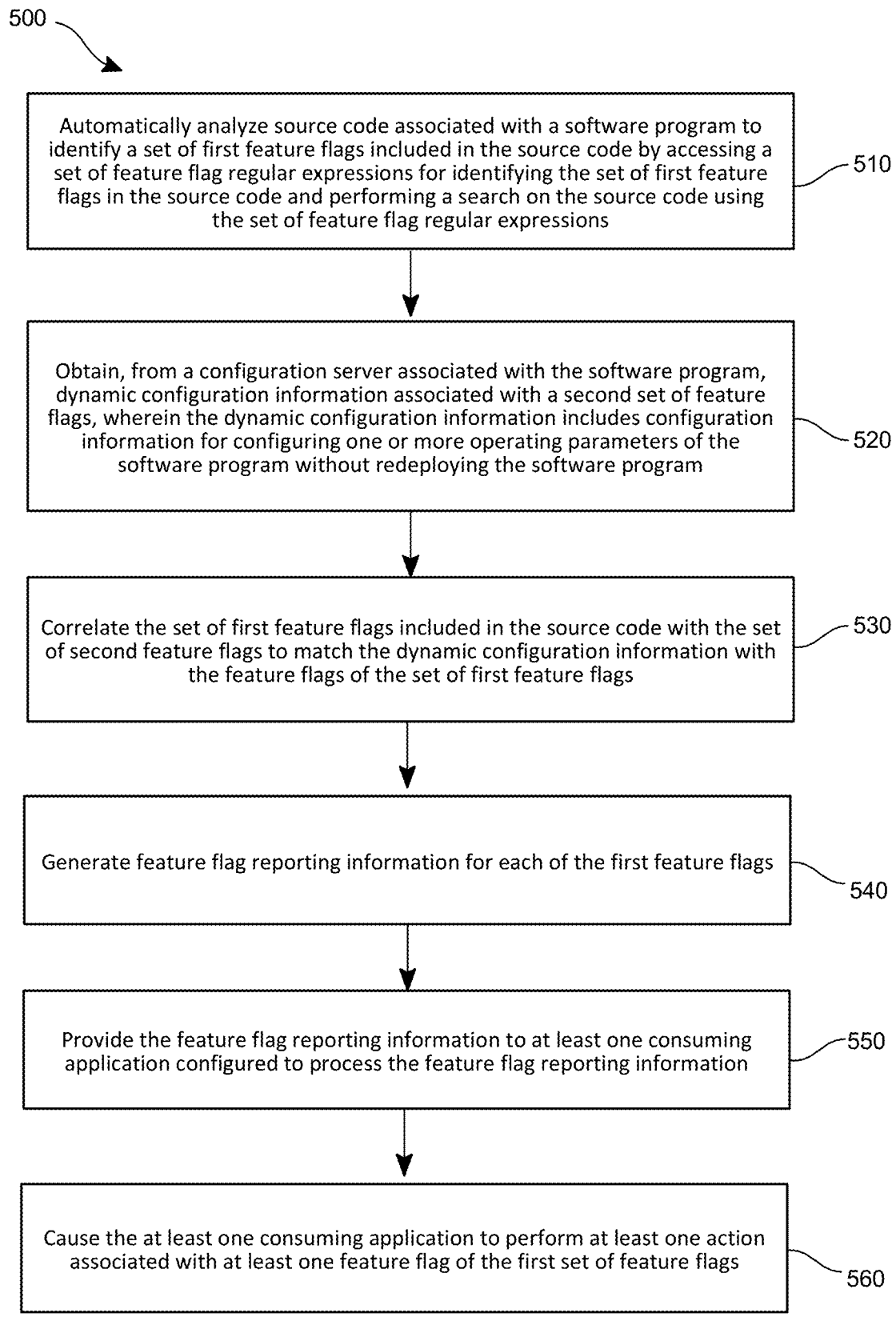
FIG. 5 is a flow chart of an example of a process for automatically managing feature flags in source code.

FIG. 5 is a flow chart of an example process 500 for automatically managing feature flags in source code. The process 500 may be implemented by the code analysis service 110 and/or the feature flag pipeline 200.

The process 500 may include an operation 510 of automatically analyzing the source code associated with a software program to identify a set of first feature flags included in the source code by accessing a set of feature flag regular expressions for identifying the set of first feature flags in the source code and performing a search on the source code using the set of feature flag regular expressions. As discussed in the preceding examples, the data analysis unit 205 of the feature flag pipeline 200 may be configured to analyze source code to identify the set of first feature flags included in the source code. The difference analyzer 275 of the feature flag pipeline 200 may be configured to access the feature flag regular expression information from the code analysis system database 235 and use those regular expressions to search for feature flags in the source code.

The process 500 may include an operation 520 of obtaining, from a configuration server associated with the software program, dynamic configuration information associated with a second set of feature flags. The dynamic configuration information may include configuration information for configuring one or more operating parameters of the software program without redeploying the software program. For example, the dynamic configuration information may include a configuration parameter for dynamically activating or deactivating program code associated with one or more features of the software program that are controlled by the second set of feature flags. The linker 285 of the data analysis unit 205 of the feature flag pipeline 200 may be configured to query the dynamic configuration sources 220 to obtain the dynamic configuration information. The dynamic configuration information may include feature flag settings that indicate whether a particular feature flag is active or inactive. Instances of the application or other software product generated from the source code may use the dynamic configuration information to turn on or turn off the features associated with the feature flag without having to regenerate the executable application from the source code.

The process 500 may include an operation 530 of correlating the set of first feature flags included in the source code with the set of second feature flags to match the dynamic configuration information with the feature flags of the set of first feature flags. The linker 285 may be configured to correlate the feature flag information for the feature flags identified in the source code with the dynamic configuration information. The correlated information may be used to determine whether the set of first feature flags have any dynamic configuration settings that have been set on the configuration server. These settings may include setting that indicate whether functionality associated with a particular feature flag has been activated or deactivated dynamically by one or more configuration settings in the dynamic configuration information.

The process 500 may include an operation 540 of generating feature flag reporting information for each of the first feature flags. As discussed in the preceding examples, the linker unit 285 may be configured to output the feature flag reporting information to the code analysis system database 235. The feature flag reporting information may include information identifying newly added feature flags, modified feature flags, and/or deleted feature flags. The feature flag reporting information may include ownership information that indicates who created the feature flag and who is responsible for maintaining the feature flag. The feature flag reporting information may also include error reporting and/or alerts information based on the performance of the features associated with the feature flag. The error reporting and/or alerts may be based on telemetry data that the application may send to the telemetry and support service 115. Other information associated with the feature flags may be included in the reporting information as well, such as but not limited to the build in which a particular feature flag was introduced.

The linker unit 285 may be configured to output feature flag reporting information determined for each of the feature flags identified via the difference analyzer 275 and the flag lookup unit 265 into the code analysis system database 235. The code analysis system database 235 may include a set of tables for storing the feature flag information which may be used to generate various reports and visualizations of the feature flag data. The data access API 230 provides a means for accessing the feature flag data stored in the code analysis system database 235. The data access API 230 may be accessed by components of the data analysis unit 205 to generate reporting and/or visualization information for the feature flag data. The data access API 230 may also be accessed by external reporting and visualization tools that may formulate queries to access the feature flag data stored in the code analysis system database 235 to generate reports and queries therefrom.

The process 500 may include an operation 550 of providing the feature flag reporting information to at least one consuming application configured to process the feature flag reporting information. As discussed with respect to FIG. 2 the feature flag reporting information may be provided to a data consumer 299 or to a code editor of computing device of a software engineer.

The process 500 may include an operation 560 of causing the at least one consuming application to perform at least one action associated with at least one feature flag of the first set of feature flags. The data consumer 299 may generating reporting information that identifies the feature flags included in the source code as well as other characteristics of the feature flag described in the preceding examples. The data consumer 299 may be configured to automatically generate a bug report associated with a feature flag that is determined to be stale and/or to automatically update the source code to remove the references to the feature flag and any related feature code. Furthermore, the feature flag reporting information may be provided to a code editor of an IDE, such as Microsoft Visual Studio, and the code editor may be configured to display a visualization of the feature flag reporting data. For example, the user interface 405 shown in FIG. 4B shows an example popup window 410 that displays information related to a feature flag in the source code of the editor user interface 405 that the user has hovered over with a mouse pointer. Other types of visualizations may be provided to convey the feature flag information to the user of the code editor.

The detailed examples of systems, devices, and techniques described in connection with FIGS. 1-5 and 8 are presented herein for illustration of the disclosure and its benefits. Such examples of use should not be construed to be limitations on the logical process embodiments of the disclosure, nor should variations of user interface methods from those described herein be considered outside the scope of the present disclosure. It is understood that references to displaying or presenting an item (such as, but not limited to, presenting an image on a display device, presenting audio via one or more loudspeakers, and/or vibrating a device) include issuing instructions, commands, and/or signals causing, or reasonably expected to cause, a device or system to display or present the item. In some embodiments, various features described in FIGS. 1-5 and 8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In embodiments in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across several machines. Processors or processor-implemented modules may be in a single geographic location (for example, within a home or office environment, or a server farm), or may be distributed across multiple geographic locations.

Figure 6:
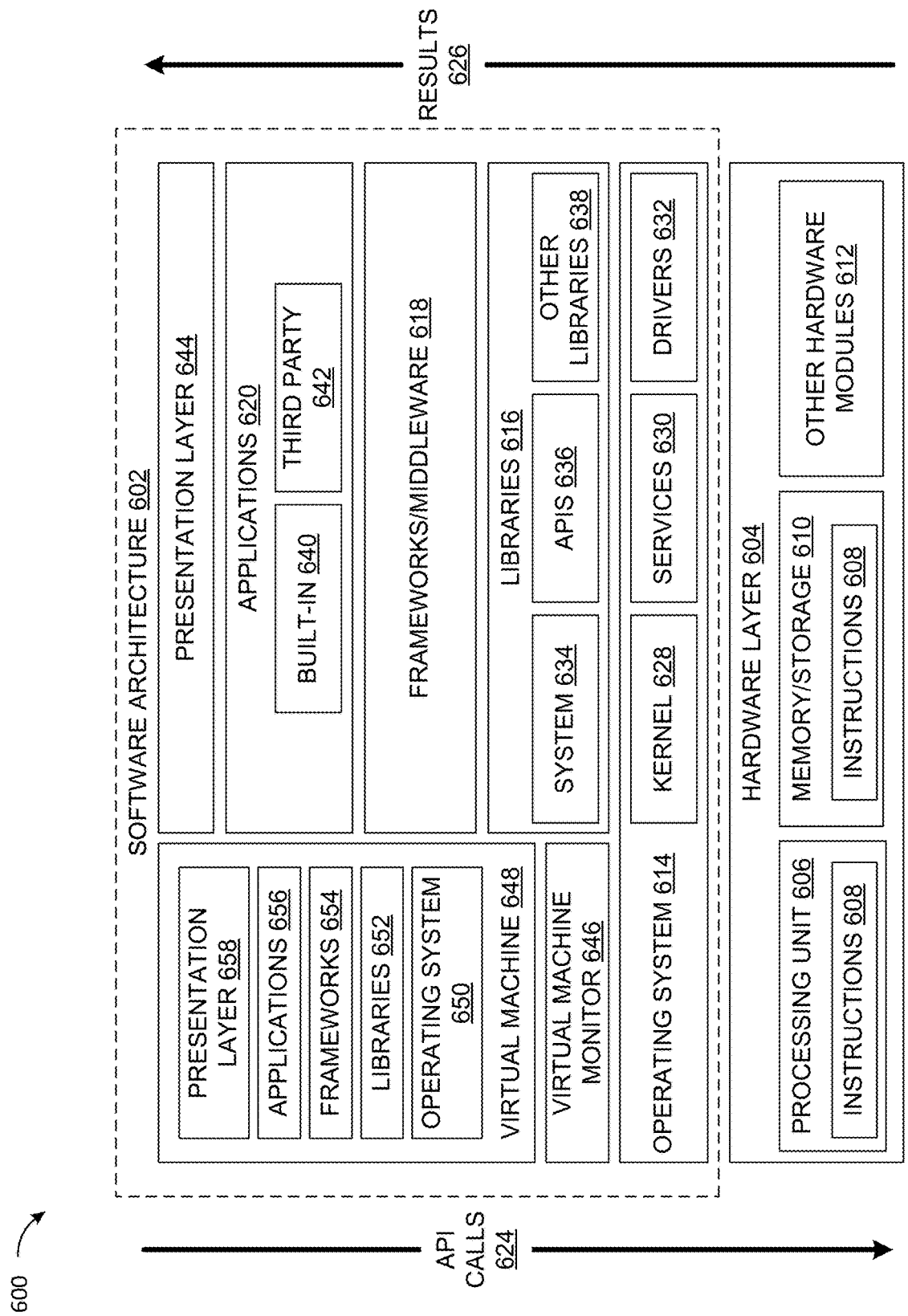
FIG. 6 is a block diagram showing an example of a software architecture, various portions of which may be used in conjunction with various hardware architectures herein described, which may implement any of the described features.

FIG. 6 is a block diagram 600 illustrating an example software architecture 602, various portions of which may be used in conjunction with various hardware architectures herein described, which may implement any of the above-described features. FIG. 6 is a non-limiting example of a software architecture and it will be appreciated that many other architectures may be implemented to facilitate the functionality described herein. The software architecture 602 may execute on hardware such as a machine 700 of FIG. 7 that includes, among other things, processors 710, memory 730, and input/output (I/O) components 750. A representative hardware layer 604 is illustrated and can represent, for example, the machine 700 of FIG. 7. The representative hardware layer 604 includes a processing unit 606 and associated executable instructions 608. The executable instructions 608 represent executable instructions of the software architecture 602, including implementation of the methods, modules and so forth described herein. The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular platform. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine 700 of FIG. 7, for example). The virtual machine 648 may be hosted by a host OS (for example, OS 614) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 652, frameworks 654, applications 656, and/or a presentation layer 658.

Figure 7:
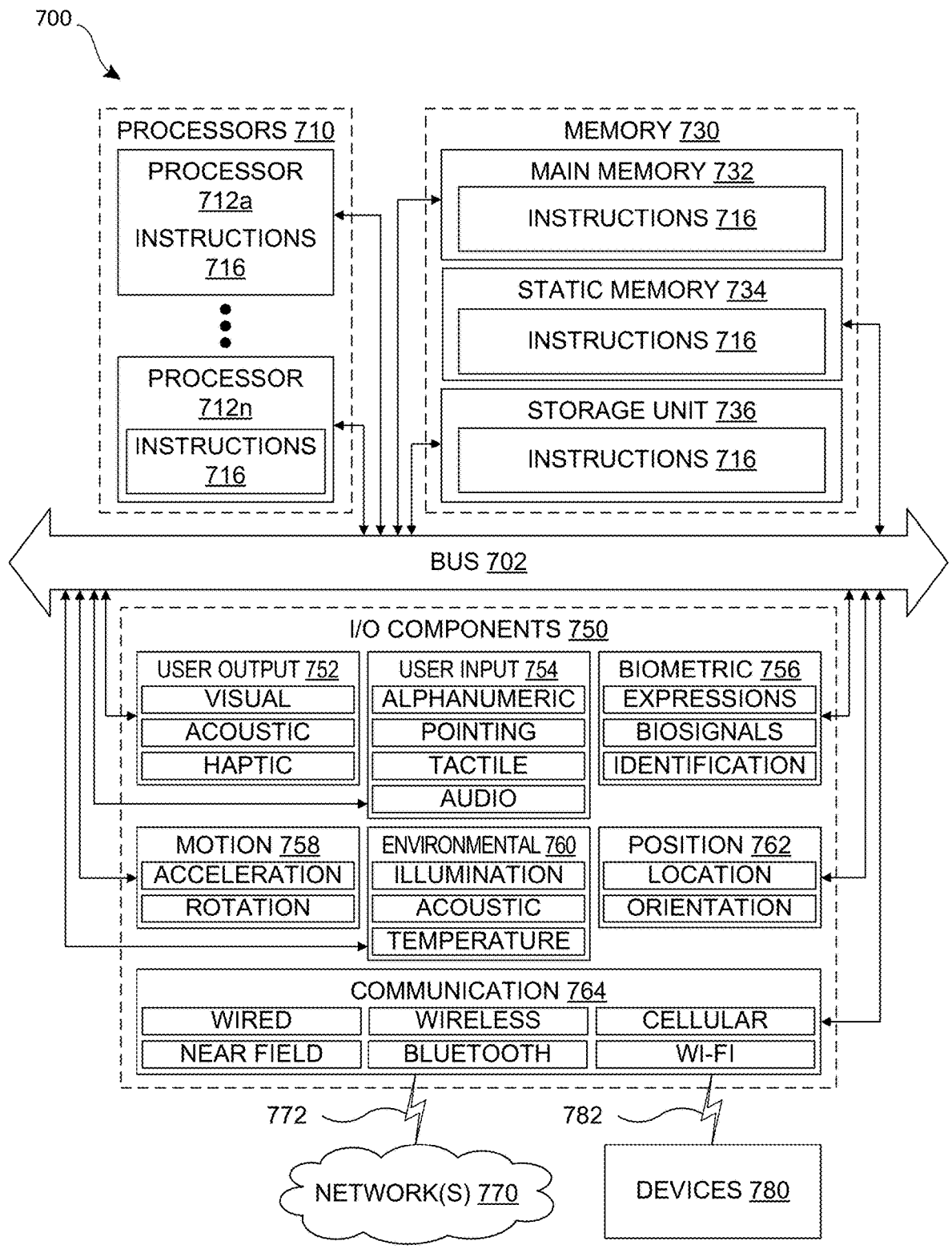
FIG. 7 is a block diagram showing components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement modules or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 734, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 752 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 760, and/or position components 762, among a wide array of other physical sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 758 may include, for example, acceleration sensors (for example, an accelerometer) and rotation sensors (for example, a gyroscope). The environmental components 760 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 762 may include, for example, location sensors (for example, a Global Position System (GPS) receiver), altitude sensors (for example, an air pressure sensor from which altitude may be derived), and/or orientation sensors (for example, magnetometers).

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
   a processor; and
   a machine-readable medium storing executable instructions that, when executed, cause the processor to perform operations comprising:
   automatically analyzing source code associated with a software program to identify a first set of feature flags included in the source code by accessing a set of feature flag regular expressions for identifying the first set of feature flags included in the source code and performing a search on the source code using the set of feature flag regular expressions;
   obtaining, from a configuration server associated with the software program, dynamic configuration information associated with a second set of feature flags, wherein the dynamic configuration information includes configuration information for configuring one or more operating parameters of the software program without redeploying the software program;
   correlating the first set of feature flags included in the source code with the second set of feature flags to match the dynamic configuration information with feature flags of the first set of feature flags;

generating feature flag reporting information for each feature flag of the first set of feature flags included in the source code;

providing the feature flag reporting information to at least one consuming application configured to process the feature flag reporting information; and causing the at least one consuming application to perform at least one action associated with at least one feature flag of the first set of feature flags included in the source code.

2. The data processing system of claim 1, wherein to automatically analyze the source code associated with the software program to identify the first set of feature flags, the machine-readable medium further stores executable instructions to cause the processor to perform operations comprising:

identifying a difference in the source code by comparing a first version of the source code to a second version of the source code; and identifying feature flags that have been added or modified in the second version of the source code.

3. The data processing system of claim 1, wherein to automatically analyze the source code associated with the software program to identify the first set of feature flags, the machine-readable medium further stores executable instructions to cause the processor to perform operations comprising:

obtaining a list of feature flags previously identified in the source code from a data store;

conducting a search through the source code to identify a subset of the list of feature flags that have been removed from the source code; and updating the list of feature flags to indicate that the subset of the list of feature flags have been removed from the source code.

4. The data processing system of claim 1, wherein the machine-readable medium further stores executable instructions to cause the processor to perform operations comprising:

receiving telemetry data associated with a first feature associated with a first feature flag;

determining that the first feature associated with the first feature flag is not functioning as expected based on the telemetry data; and dynamically deactivating the first feature flag in response to determining that the first feature associated with the first feature flag is not functioning as expected based on the telemetry data.

5. The data processing system of claim 1, wherein the machine-readable medium further stores executable instructions to cause the processor to perform operations comprising:

receiving a request for the feature flag reporting information from a code editor of a computing device on which the source code is being edited;

providing the feature flag reporting information to the computing device; and causing the code editor of the computing device to display the feature flag reporting information in the code editor of the computing device by highlighting one or more feature flags of the first set of feature flags visible in the code editor of the computing device.

6. The data processing system of claim 1, wherein the machine-readable medium further stores executable instructions to cause the processor to perform operations comprising:

automatically determining that a first feature flag of the first set of feature flags included in the source code is no longer being utilized; and automatically generating a bug report on the source code for removal of the first feature flag of the first set of feature flags from the source code.

7. The data processing system of claim 6, wherein the machine-readable medium further stores executable instructions to cause the processor to perform operations comprising:

automatically updating the source code to remove the first feature flag of the first set of feature flags from the source code; and automatically updating the bug report on the source code to set a status of the bug report to a fixed status.

8. A method implemented in a data processing system for automatically managing feature flags in source code, the method comprising:

automatically analyzing the source code associated with a software program to identify a first set of feature flags included in the source code by accessing a set of feature flag regular expressions for identifying the first set of feature flags included in the source code and performing a search on the source code using the set of feature flag regular expressions;

obtaining, from a configuration server associated with the software program, dynamic configuration information associated with a second set of feature flags, wherein the dynamic configuration information includes configuration information for configuring one or more operating parameters of the software program without redeploying the software program;

correlating the first set of feature flags included in the source code with the second set of feature flags to match the dynamic configuration information with feature flags of the first set of feature flags;

generating feature flag reporting information for each feature flag of the first set of feature flags included in the source code;

providing the feature flag reporting information to at least one consuming application configured to process the feature flag reporting information; and causing the at least one consuming application to perform at least one action associated with at least one feature flag of the first set of feature flags included in the source code.

9. The method of claim 8, wherein automatically analyzing the source code associated with the software program to identify the first set of feature flags further comprises:

identifying a difference in the source code by comparing a first version of the source code to a second version of the source code; and identifying feature flags that have been added or modified in the second version of the source code.

10. The method of claim 8, wherein automatically analyzing the source code associated with the software program to identify the first set of feature flags further comprises:

obtaining a list of feature flags previously identified in the source code from a data store;

conducting a search through the source code to identify a subset of the list of feature flags that have been removed from the source code; and updating the list of feature flags to indicate that the subset of the list of feature flags have been removed from the source code.

11. The method of claim 8, further comprising:
receiving telemetry data associated with a first feature associated with a first feature flag;
determining that the first feature associated with the first feature flag is not functioning as expected based on the telemetry data; and
dynamically deactivating the first feature flag in response to determining that the first feature associated with the first feature flag is not functioning as expected based on the telemetry data.

12. The method of claim 8, further comprising:
receiving a request for the feature flag reporting information from a code editor of a computing device on which the source code is being edited;
providing the feature flag reporting information to the computing device; and
causing the code editor of the computing device to display the feature flag reporting information in the code editor of the computing device by highlighting one or more feature flags of the first set of feature flags visible in the code editor of the computing device.

13. The method of claim 8, further comprising:
automatically determining that a first feature flag of the first set of feature flags included in the source code is no longer being utilized; and
automatically generating a bug report on the source code for removal of the first feature flag of the first set of feature flags from the source code.

14. The method of claim 13, further comprising:
automatically updating the source code to remove the first feature flag of the first set of feature flags from the source code; and
automatically updating the bug report on the source code to set a status of the bug report to a fixed status.

15. A machine-readable medium on which executable instructions are stored that, when executed, cause a processor of a programmable device to perform functions comprising:
automatically analyzing source code associated with a software program to identify a first set of feature flags included in the source code by accessing a set of feature flag regular expressions for identifying the first set of feature flags included in the source code and performing a search on the source code using the set of feature flag regular expressions;
obtaining, from a configuration server associated with the software program, dynamic configuration information associated with a second set of feature flags, wherein the dynamic configuration information includes configuration information for configuring one or more operating parameters of the software program without redeploying the software program;
correlating the first set of feature flags included in the source code with the second set of feature flags to match the dynamic configuration information with feature flags of the first set of feature flags;
generating feature flag reporting information for each feature flag of the first set of feature flags included in the source code;
providing the feature flag reporting information to at least one consuming application configured to process the feature flag reporting information; and
causing the at least one consuming application to perform at least one action associated with at least one feature flag of the first set of feature flags included in the source code.

16. The machine-readable medium of claim 15, wherein to automatically analyze the source code associated with the software program to identify the first set of feature flags, the machine-readable medium further stores executable instructions to cause the processor to perform functions comprising:
identifying a difference in the source code by comparing a first version of the source code to a second version of the source code; and
identifying feature flags that have been added or modified in the second version of the source code.

17. The machine-readable medium of claim 15, wherein to automatically analyze the source code associated with the software program to identify the first set of feature flags, the machine-readable medium further stores executable instructions to cause the processor to perform functions comprising:
obtaining a list of feature flags previously identified in the source code from a data store;
conducting a search through the source code to identify a subset of the list of feature flags that have been removed from the source code; and
updating the list of feature flags to indicate that the subset of the list of feature flags have been removed from the source code.

18. The machine-readable medium of claim 15, wherein the machine-readable medium further stores executable instructions to cause the processor to perform functions comprising:
receiving telemetry data associated with a first feature associated with a first feature flag;
determining that the first feature associated with the first feature flag is not functioning as expected based on the telemetry data; and
dynamically deactivating the first feature flag in response to determining that the first feature associated with the first feature flag is not functioning as expected based on the telemetry data.

19. The machine-readable medium of claim 15, wherein the machine-readable medium further stores executable instructions to cause the processor to perform functions comprising:
receiving a request for the feature flag reporting information from a code editor of a computing device on which the source code is being edited;
providing the feature flag reporting information to the computing device; and
causing the code editor of the computing device to display the feature flag reporting information in the code editor of the computing device by highlighting one or more feature flags of the first set of feature flags visible in the code editor of the computing device.

20. The machine-readable medium of claim 15, wherein the machine-readable medium further stores executable instructions to cause the processor to perform functions comprising:
automatically determining that a first feature flag of the first set of feature flags included in the source code is no longer being utilized;
automatically generating a bug report on the source code for removal of the first feature flag of the first set of feature flags from the source code;
automatically updating the source code to remove the first feature flag of the first set of feature flags from the source code; and automatically updating the bug report on the source code to set a status of the bug report to a fixed status.

\* \* \* \* \*